United States Patent
Nakayama et al.

(10) Patent No.: US 10,437,093 B2
(45) Date of Patent: *Oct. 8, 2019

(54) TRANSPARENT CONDUCTIVE FILM AND TOUCH PANEL

(71) Applicant: FUJIFILM Corporation, Tokyo (JP)

(72) Inventors: Masaya Nakayama, Ashigarakami-gun (JP); Makoto Sutou, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 204 days.

This patent is subject to a terminal disclaimer.

(21) Appl. No.: 15/695,846

(22) Filed: Sep. 5, 2017

(65) Prior Publication Data

US 2017/0363899 A1 Dec. 21, 2017

Related U.S. Application Data

(63) Continuation of application No. PCT/JP2015/079031, filed on Oct. 14, 2015.

(30) Foreign Application Priority Data

Mar. 20, 2015 (JP) .................................. 2015-058283

(51) Int. Cl.
*G06F 3/041* (2006.01)
*G02F 1/1333* (2006.01)
(Continued)

(52) U.S. Cl.
CPC ........ *G02F 1/13338* (2013.01); *G02F 1/1343* (2013.01); *G06F 3/041* (2013.01);
(Continued)

(58) Field of Classification Search
None
See application file for complete search history.

(56) References Cited

U.S. PATENT DOCUMENTS

2014/0078111 A1* 3/2014 Lee .................. G06F 3/041
345/176
2014/0138143 A1 5/2014 Lee et al.
(Continued)

FOREIGN PATENT DOCUMENTS

| JP | 2013-206315 A | 10/2013 |
|---|---|---|
| JP | 2014-16944 A | 1/2014 |
| JP | 2014-106974 A | 6/2014 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2015/079031, dated Oct. 5, 2017, including an English translation of the Written Opinion.

(Continued)

*Primary Examiner* — Lunyi Lao
*Assistant Examiner* — Kirk W Hermann
(74) *Attorney, Agent, or Firm* — Birch, Stewart, Kolasch & Birch, LLP

(57) ABSTRACT

A transparent conductive film having a transmissive region includes a first electrode formed of a first thin metal wire arranged in the transmissive region; and a second electrode formed of a second thin metal wire arranged on a side opposite to a viewing side from the first electrode so as to intersect the first thin metal wire in the transmissive region, in which the first thin metal wire has a first front surface that is directed to the viewing side and has a line width W1A, and a first back surface that is directed to the side opposite to the viewing side and has a line width W1B, the second thin metal wire has a second front surface that is directed to the viewing side and has a line width W2A, and a second back surface that is directed to the side opposite to the viewing side and has a line width W2B, and the line widths W1A, (Continued)

W1B, W2A, and W2B are in a range of 0.5 to 10 μm, and the line widths satisfy a relationship of $W1B < W2A \leq W1A < W2B$.

19 Claims, 4 Drawing Sheets

(51) Int. Cl.
  *G06F 3/044* (2006.01)
  *G02F 1/1343* (2006.01)
(52) U.S. Cl.
  CPC ........ *G06F 3/044* (2013.01); *B32B 2307/202* (2013.01); *B32B 2307/412* (2013.01); *B32B 2457/208* (2013.01); *G06F 2203/04103* (2013.01); *G06F 2203/04107* (2013.01)

(56) References Cited

U.S. PATENT DOCUMENTS

| | | | |
|---|---|---|---|
| 2015/0177876 A1* | 6/2015 | Ishii | G06F 3/044 345/174 |
| 2015/0205422 A1* | 7/2015 | Choi | G06F 3/041 345/173 |

OTHER PUBLICATIONS

International Search Report (Form PCT/ISA/210) for International Application No. PCT/JP2015/079031, dated Nov. 17, 2015, including an English translation.

\* cited by examiner

TRANSPARENT CONDUCTIVE FILM AND TOUCH PANEL

CROSS-REFERENCE TO RELATED APPLICATIONS

This application is a Continuation of PCT International Application No. PCT/JP2015/79031, filed on Oct. 14, 2015, which claims priority under 35 U.S.C. § 119(a) to Japanese Patent Application No. 2015-58283, filed on Mar. 20, 2015. Each of the above application(s) is hereby expressly incorporated by reference, in its entirety, into the present application.

BACKGROUND OF THE INVENTION

1. Field of the Invention

The present invention relates to a transparent conductive film and particularly to a transparent conductive film used for a touch panel or the like.

In addition, the present invention relates to a touch panel using a transparent conductive film.

2. Description of the Related Art

In recent years, in various electronic devices such as a portable information device, a touch panel that can be used in combination with a display device such as a liquid crystal display device and performs an input operation to an electronic device by touching a screen has come into wide use.

For example, JP2013-206315A discloses a touch panel in which a first electrode formed of a stripped copper wiring is formed on a front surface of a transparent insulating substrate and a second electrode formed of a stripped copper wiring is formed on a rear surface of the transparent insulating substrate in a direction orthogonal to the copper wiring of the first electrode.

In the touch panel, specular reflection is reduced and contrast is improved by forming a blackened layer formed of a black copper oxide film at the end portion of the copper wiring which becomes a viewing side, in the case in which the touch panel is mounted in a display device or the like, out of both the copper wirings of the first electrode and the copper wiring of the second electrode. For example, in the case in which the first electrode formed on the front surface of the transparent insulating substrate is arranged on the viewing side, a blackened layer is formed at each of the end portion of the copper wiring of the first electrode on the side opposite to the transparent insulating substrate and the end portion of the copper wiring of the second electrode on the side close to the transparent insulating substrate.

SUMMARY OF THE INVENTION

In order to prevent the presence of a copper wiring having light shielding properties from being visually recognized and to reduce moire generated due to the interference of a pixel of a display device in which a touch panel is mounted with the copper wiring, the copper wiring which forms a first electrode and a second electrode needs to be thinned to a width of about 1 to 5 μm.

Such a copper wiring can be obtained by forming a copper foil on a transparent insulating substrate, and patterning the copper foil by a photolithography method using a resist. In this case, it is necessary to perform wet etching by causing the resist to adhere to the copper foil with high adhesion to perform thin patterning of a line width of about 1 to 5 μm with high accuracy. In this case, as shown in FIG. 7, copper wirings 2 and 3 each having a reversely tapered cross-sectional shape in which a line width W2 of the copper wiring on a side close to a transparent insulating substrate 1 is smaller than a line width W1 of the copper wiring on a side opposite to the transparent insulating substrate 1 are formed.

However, as shown in FIG. 7, the mesh-like or stripped copper wirings 2 and 3 each having the same line width of about 1 to 5 μm are formed on a front surface 1A and a rear surface 1B of the transparent insulating substrate 1. For example, in the case of vertically observing the transparent insulating substrate 1 from the front surface 1A, although the copper wirings are designed to achieve line thinning and to have the same line width, the line width of the copper wiring 2 positioned on the viewing side looks larger than the line width of the copper wiring 3 positioned on the side opposite to the viewing side. Thus, there is a problem that the presence of the copper wirings 2 and 3 is easily recognized visually and thus deteriorates visibility.

It is found that this is because, since the copper wirings 2 and 3 each have a reversely tapered cross-sectional shape, the line width W1 of the end portion of the copper wiring 2 formed on the front surface 1A of the transparent insulating substrate 1 on the viewing side is larger than the line width W2 of the end portion of the copper wiring 3 formed on the rear surface 1B of the transparent insulating substrate 1 on the viewing side.

The problem that the presence of the copper wirings 2 and 3 is easily recognized visually becomes remarkable particularly in the case in which, as shown in FIG. 8, a blackened layer 4 is formed at each of the end portion of the copper wiring 2 formed on the front surface 1A of the transparent insulating substrate 1 on the viewing side and the end portion of the copper wiring 3 formed on the rear surface 1B of the transparent insulating substrate 1 on the viewing side to reduce the specular reflection of the copper wiring and improve pattern visibility caused by reflection of external light.

The present invention has been made to solve the above problems of the related art, and an object thereof is to provide a transparent conductive film capable of ensuring excellent visibility in a case in which an electrode formed of thin metal wires that are thinly patterned is formed on each of a viewing side and a side opposite to the viewing side.

In addition, another object of the present invention is to provide a touch panel using such a transparent conductive film.

A transparent conductive film according to the present invention is a transparent conductive film having a transmissive region comprising: a first electrode formed of a first thin metal wire arranged in the transmissive region; and a second electrode formed of a second thin metal wire arranged on a side opposite to a viewing side from the first electrode so as to intersect the first thin metal wire in the transmissive region, in which the first thin metal wire has a first front surface that is directed to the viewing side and has a line width W1A, and a first back surface that is directed to the side opposite to the viewing side and has a line width W1B, the second thin metal wire has a second front surface that is directed to the viewing side and has a line width W2A, and a second back surface that is directed to the side opposite to the viewing side and has a line width W2B, and the line widths W1A, W1B, W2A, and W2B are in a range of 0.5 to 10 μm, and the line widths satisfy a relationship of $W1B < W2A \leq W1A < W2B$.

It is preferable that the line widths W1A and W2A satisfy a relationship of W1A−W2A≤0.3×W1A.

In addition, it is preferable that the line widths W1A, W1B, W2A, and W2B satisfy a relationship of W2B−W2A<W1A−W1B. In this case, it is more preferable that a thickness H2 of the second thin metal wire is larger than that a thickness H1 of the first thin metal wire.

A difference between the line width W2B and the line width W1A is preferably less than 4 μm and is particularly preferably less than 1 μm.

It is preferable that the line width W1A is 1.5 μm or more and 5 μm or less, and the thickness H1 of the first thin metal wire and the thickness H2 of the second thin metal wire are 0.5 μm or more and 3 μm or less.

Further, the first front surface of the first thin metal wire and the second front surface of the second thin metal wire may be blackened layers.

It is preferable that the first thin metal wire and the second thin metal wire are formed of copper.

The first electrode and the second electrode may be respectively arranged on both surfaces of one transparent insulating substrate.

A touch panel according to the present invention is a touch panel using the transparent conductive film. As the touch panel, a projection type electrostatic capacitance touch panel that can detect multi-touch is preferable.

According to the present invention, since the first thin metal wire of the first electrode has the first front surface that is directed to the viewing side and has a line width W1A, and the first back surface that is directed to the side opposite to the viewing side and has a line width W1B, and the second thin metal wire of the second electrode arranged on the side opposite to the viewing side from the first electrode has the second front surface that is directed to the viewing side and has the line width W2A and the second back surface that is directed to the side opposite to the viewing side and has a line width W2B, and the line widths W1A, W1B, W2A, and W2B are in a range of 0.5 to 10 μm and satisfy the relationship of W1B<W2A≤W1A<W2B, it is possible to ensure excellent visibility in a transparent conductive film in which an electrode formed of thin metal wires that are thinly patterned with high accuracy is formed on each of the viewing side and the side opposite to the viewing side.

DESCRIPTION OF THE PREFERRED EMBODIMENTS

Embodiment 1

Figure 1:
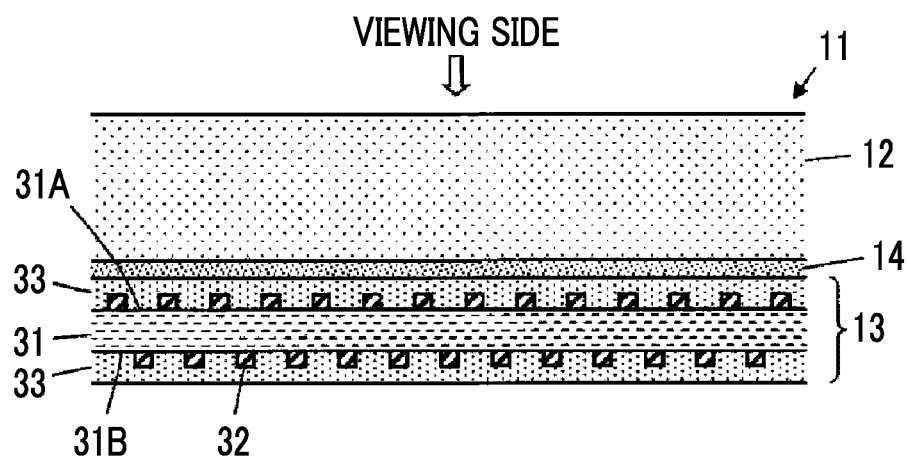
FIG. 1 is a partial cross-sectional view showing a touch panel according to Embodiment 1 of the present invention.

FIG. 1 shows a configuration of a touch panel 11 using a transparent conductive film 13 according to Embodiment 1 of the present invention. The touch panel 11 has a transparent insulating cover panel 12 having a flat plate shape, and the transparent conductive film 13 is bonded to a surface of the cover panel 12 on a side opposite to a viewing side with a transparent adhesive 14. In the transparent conductive film 13, a conductive member 32 is formed on both surfaces of the transparent insulating substrate 31, that is, on a front surface 31A and on a rear surface 31B, respectively. In addition, as shown in FIG. 1, for the purpose of flattening or protecting the conductive member 32, a transparent protective layer 33 may be formed on both surfaces of the transparent insulating substrate 31 so as to cover the conductive member 32.

As the material for the cover panel 12, tempered glass, polycarbonate (PC), a polymethyl methacrylate resin (PMMA), or the like can be used and a thickness thereof is preferably 0.1 to 1.5 mm.

As the material for the transparent insulating substrate 31, glass, polyethylene terephthalate (PET), polyethylene naphthalate (PEN), a cycloolefin polymer (COP), a cyclic olefin copolymer (COC), or the like can be used, and a thickness thereof is preferably 20 to 200 μm.

Figure 2:
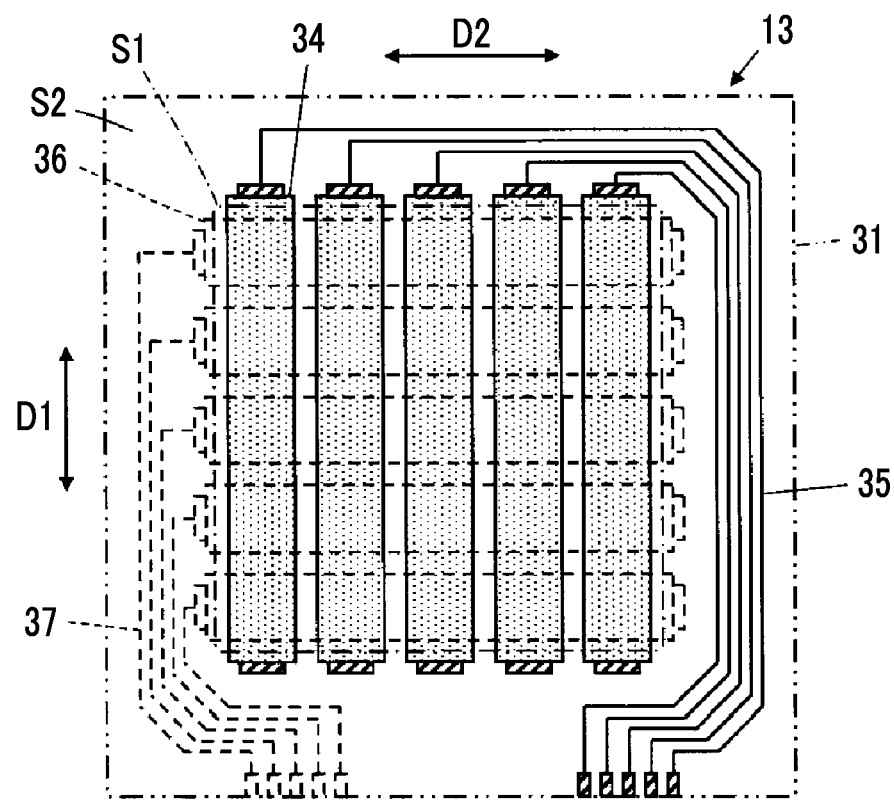
FIG. 2 is a plan view showing a transparent conductive film used for the touch panel according to Embodiment 1.

As shown in FIG. 2, a transmissive region S1 is partitioned in the transparent conductive film 13, and a peripheral region S2 is partitioned on the outside of the transmissive region S1. On the front surface 31A of the transparent insulating substrate 31, a plurality of first electrodes 34 that respectively extend in a first direction D1, are arranged in parallel in a second direction D2 orthogonal to the first direction D1, and are formed of the conductive member 32 is formed in the transmissive region S1, and a plurality of first peripheral wirings 35 that are connected to the plurality of first electrodes 34 and are formed of the conductive member 32 is mutually closely arranged in the peripheral region S2.

Similarly, on the rear surface 31B of the transparent insulating substrate 31, a plurality of second electrodes 36 that respectively extend in the second direction D2, are arranged in parallel in the first direction D1, and are formed of the conductive member 32 is formed in the transmissive region S1, and a plurality of second first peripheral wirings 37 that are connected to the plurality of second electrodes 36 and are formed of the conductive member 32 is mutually closely arranged in the peripheral region S2.

Figure 3:
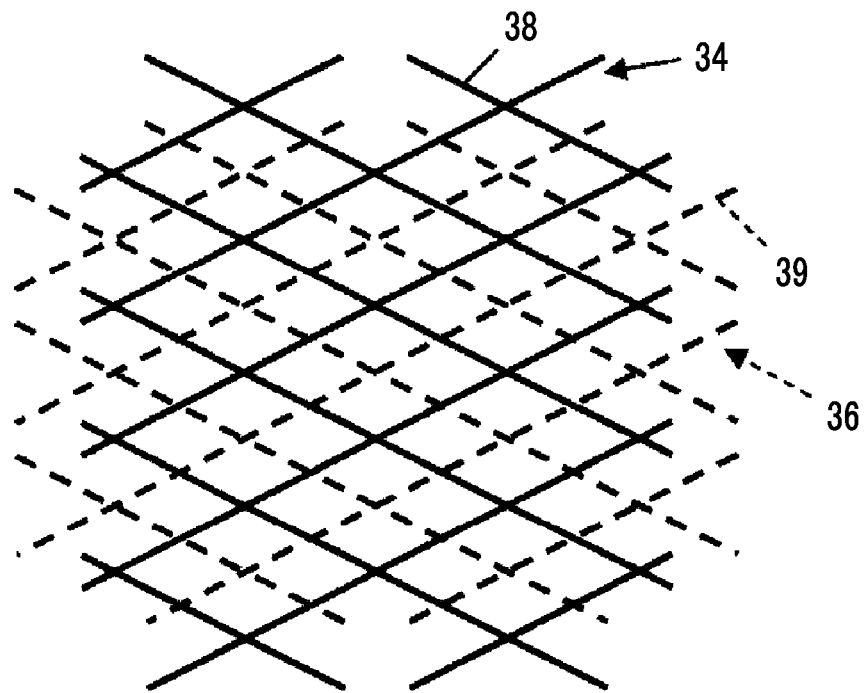
FIG. 3 is a partial plan view showing a detection electrode of the transparent conductive film used for the touch panel according to Embodiment 1.

FIG. 3 shows intersections of the first electrodes 34 and the second electrodes 36. The first electrodes 34 arranged on the front surface 31A of the transparent insulating substrate 31 are formed with a mesh pattern formed by the first thin metal wire 38, and the second electrodes 36 arranged on the rear surface 31B of the transparent insulating substrate 31 are also formed with a mesh pattern formed by the second thin metal wire 39. In the intersection of the first electrode 34 and the second electrode 36, in the case in which the transparent conductive film is viewed from the viewing side, the first thin metal wire 38 and the second thin metal wire 39 are arranged so as to intersect each other. In FIG. 3, in order to easily distinguish the first thin metal wire 38 and the second thin metal wire 39, the second thin metal wire 39 is indicated by a dotted line but is actually formed of a connected wire like the first thin metal wire 38.

As the shape of the mesh pattern, a pattern in which the same mesh is repeatedly arranged as shown in FIG. 3 is preferable and a diamond shape is particularly preferable as the mesh shape. However, the mesh shape may be a parallelogram shape, a square shape, a rectangular shape, or another polygonal shape. A distance between the centers of the meshes (mesh pitch) is preferably 100 to 600 µm from the viewpoint of visibility. It is preferable that a mesh pattern formed by the first thin metal wire 38 and a mesh pattern formed by the second thin metal wire 39 have the same shape. Further, as shown in FIG. 3, the mesh pattern formed by the first thin metal wire 38 and the mesh pattern formed by the second thin metal wire 39 are arranged to be shifted by a distance corresponding to half of the mesh pitch and are preferably arranged to form a mesh pattern with a half mesh pitch from the viewing side from the viewpoint of visibility. As another embodiment, the mesh shape may be a random pattern.

In addition, a dummy mesh pattern insulated from the electrodes respectively formed of the first thin metal wire 38 and the second thin metal wire 39 may be provided between the first electrodes 34 adjacent to each other and between the second electrodes 36 adjacent to each other. The dummy mesh pattern is preferably formed in the same mesh shape as the mesh pattern that forms the electrode.

Figure 4:
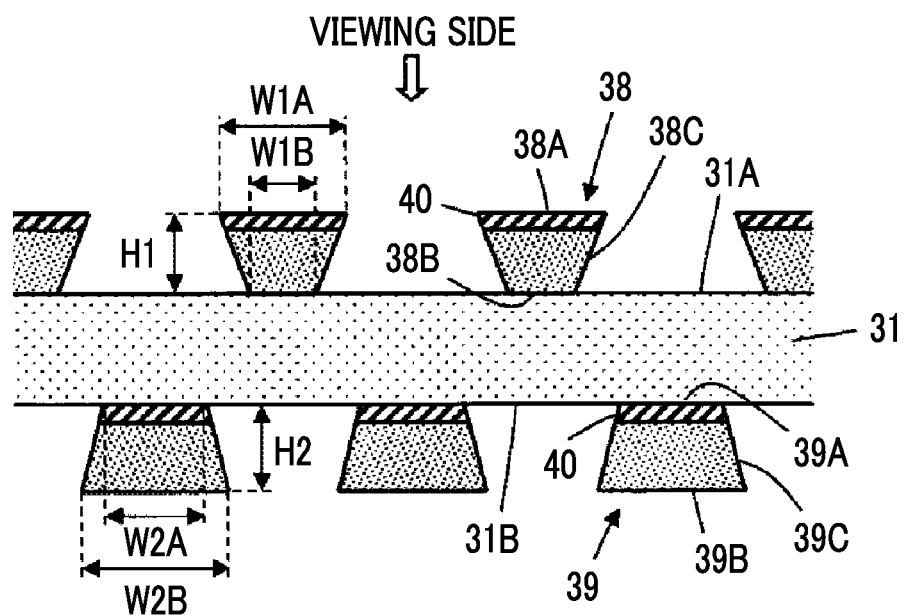
FIG. 4 is a partial cross-sectional view showing a first thin metal wire and a second thin metal wire of the transparent conductive film used for the touch panel according to Embodiment 1.

As shown in FIG. 4, the first thin metal wire 38 of the first electrode 34 arranged on the front surface 31A of the transparent insulating substrate 31 has a first front surface 38A that is directed to the viewing side and a first back surface 38B that is directed to the side opposite to the viewing side, and has a shape in which a line width W1A of the first front surface 38A is larger than a line width W1B of the first back surface 38B, a so-called reversely tapered cross-sectional shape.

In addition, the second thin metal wire 39 of the second electrode 36 arranged on the rear surface 31B of the transparent insulating substrate 31 also has a second front surface 39A that is directed to the viewing side and a second back surface 39B that is directed to the side opposite to the viewing side, and has a shape in which a line width W2B of the second back surface 39B is larger than a line width W2A of the second front surface 39A, a so-called reversely tapered cross-sectional shape.

As the material for the first thin metal wire 38 and the second thin metal wire 39, metals such as copper, silver, aluminum, gold, and molybdenum or alloys thereof may be used and a film thickness thereof is preferably 0.1 to 5 µm. Among these, copper is preferable from the viewpoint of a low resistance value, stability, and costs.

In FIG. 4, the transparent insulating substrate 31 and the first thin metal wire 38 or the second thin metal wire 39 are directly in contact with each other. However, one or more layers of functional layers, such as an adhesion reinforcing layer, an undercoat layer, or a hard coat layer, can be formed between the transparent insulating substrate 31 and the first thin metal wire 38 or the second thin metal wire 39.

A blackened layer 40 is formed on each of the first front surface 38A of the first thin metal wire 38 on the viewing side and the second front surface 39A of the second thin metal wire 39 on the viewing side. The blackened layer 40 is provided to reduce specular reflection of the thin metal wires on the first front surface 38A of the first thin metal wire 38 and on the second front surface 39A of the second thin metal wire 39. For the blackened layer 40, an oxide including copper is preferably used, and copper oxide (II) (CuO), $CuO\text{—}Cr_2O_3$, $CuO\text{—}Fe_3O_4\text{—}Mn_2O_3$, $CuO\text{—}Fe_2O_3\text{—}Cr_2O_3$, and the like may be used. As other materials, black iron oxide ($Fe_3O_4$), titanium black, nickel, chromium or the like may be used and a film thickness thereof is preferably 0.01 to 0.4 µm.

Generally, in the case in which light shielding members having the same line width are respectively arranged on the front and rear surfaces of a transparent plate and the transparent plate is observed from the front surface side, the light shielding member on the rear surface side is viewed using light refracted on the front surface of the transparent plate, and thus, as the results of the experiment, it is found that the line width of the light shielding member arranged on the rear surface looks larger than the line width of the light shielding member arranged on the front surface.

Therefore, it is preferable that the line width W1A of the first front surface 38A of the first thin metal wire 38 arranged on the front surface 31A of the transparent insulating substrate 31 is set to have a value slightly larger than the line width W2A of the second front surface 39A of the second thin metal wire 39 arranged on the rear surface 31B of the transparent insulating substrate 31 in advance.

In the present invention, the line widths W1A and W1B of the first thin metal wire 38 and the line widths W2A and W2B of the second thin metal wire 39 are set to satisfy a relationship of $$W1B < W2A \leq W1A < W2B \quad (1).$$

In addition, the line widths W1A, W1B, W2A, and W2B of the first thin metal wire and the second thin metal wire are all set to be in a range of 0.5 to 10 µm so that the first thin metal wire 38 and the second thin metal wire 39 are hardly visually recognized.

However, in order to more reliably prevent visual recognition of the first thin metal wire 38 and the second thin metal wire 39 due to a difference in line width between the first thin metal wire 38 and the second thin metal wire 39 in the case in which the transparent conductive film is viewed from the viewing side, a difference between the line width W1A of the first front surface 38A of the first thin metal wire 38 and the line width W2A of the second front surface 39A of the second thin metal wire 39 (W1A−W2A) is desirably equal to or less than a value 0.3 times the line width W1A. That is, it is desirable that the line widths W1A and W2A satisfy a relationship of $$W1A - W2A \leq 0.3 \times W1A \quad (2).$$

By setting the line widths in this range, the apparent line widths of the first thin metal wire 38 and the second thin metal wire 39 become uniform and visual recognition of the first thin metal wire 38 and the second thin metal wire 39 can be more reliably prevented.

As a more preferable range, the line width W1A is preferably larger than the line width W2A by 0.02 µm or more and a relationship of 0.02 µm ≤ W1A−W2A ≤ 0.3×W1A is satisfied.

By respectively arranging such first thin metal wire 38 and second thin metal wire 39 on the front surface 31A and on the rear surface 31B of the transparent insulating substrate 31, out of the front surface 31A and the rear surface 31B of the transparent insulating substrate 31, the line width W1A of the first front surface 38A of the first thin metal wire 38 on the viewing side arranged on the front surface 31A positioned on the viewing side is set to have an almost equal value to the line width W2A of the second front surface 39A of the second thin metal wire 39 on the viewing side arranged on the rear surface 31B positioned on the side opposite to the viewing side or is set to have a value slightly larger than the line width W2A. Thus, in the case in which the transparent conductive film 13 is observed from the viewing side, the first thin metal wire 38 on the front surface 31A of the transparent insulating substrate 31 and the second thin metal wire 39 on the rear surface 31B seem to have the same line width. Accordingly, the presence of the thin metal wires of the first electrode 34 formed of the first thin metal wire 38 and the second electrode 36 formed of the second thin metal wire 39 is hardly visually recognized and thus the visibility of the transmissive region S1 of the transparent conductive film 13 is improved.

In addition, in the case in which a side surface 39C of the second thin metal wire 39 having a reversely tapered cross-sectional shape arranged on the rear surface 31B of the transparent insulating substrate 31 is easily viewed in the case in which the transparent conductive film is viewed from the viewing side, a problem of viewing angle dependency occurs in which the effect of reflected light on the side surface 39C becomes significant according to the viewing angle, and in the case in which the transparent conductive film is obliquely viewed, the metallic luster of the thin metal wire becomes noticeable according to the viewing angle.

Here, it is desirable that a difference between the line width W2B of the second back surface 39B and the line width W2A of the second front surface 39A of the second thin metal wire 39 (W2B−W2A) is smaller than a difference between the line width W1A of the first front surface 38A and the line width W1B of the first back surface 38B of the first thin metal wire 38 (W1A−W1B) such that the side surface 39C of the second thin metal wire 39 on the rear surface 31B side of the transparent insulating substrate 31 is hardly viewed. That is, it is desirable that the line widths W1A and W1B of the first thin metal wire 38 and the line widths W2A and W2B of the second thin metal wire 39 satisfy a relationship of $$W2B-W2A<W1A-W1B \quad (3).$$

In this manner, the effect of reflected light according to the viewing angle can be reduced.

The first thin metal wire 38 and the second thin metal wire 39 each having a reversely tapered cross-sectional shape can be formed by performing wet etching on metal layers of copper or the like respectively formed on both surfaces of the transparent insulating substrate 31 at the same time. However, in order to realize the configuration represented by Formula (3), it is preferable that a thickness H2 of the second thin metal wire 39 has a larger value than a thickness H1 of the first thin metal wire 38. This is because, in the case in which metals having different thicknesses are subjected to wet etching at the same time, the time during which the metal having a smaller thickness is over-etched becomes longer, a reversely tapered shape is tightly formed, and thus, the shape satisfying the above condition is easily formed.

Specifically, it is desirable for the transparent conductive film 13 used for the touch panel 11 to set the line width W1A of the first front surface 38A of the first thin metal wire 38 to 1.5 µm or more and 5 µm or less and to set the thickness H1 of the first thin metal wire 38 and the thickness H2 of the second thin metal wire 39 to 0.5 µm or more and 3 µm or less. By setting the thicknesses of the first thin metal wire 38 and the second thin metal wire 39 to 0.5 µm or more and 3 µm or less, a thin metal wire having a line width of 1.5 µm or more and 5 µm or less is easily formed. Particularly, by setting the thickness of the thin metal wire to a value equal to or less than half of the line width, a thin metal wire is easily formed by performing wet etching on a metal wire having a fine line width of 5 µm or less. Further, it is preferable that the line width W1A of the first front surface 38A of the first thin metal wire 38 is 2 µm or more and 4 µm or less, and the thickness H1 of the first thin metal wire 38 and the thickness H2 of the second thin metal wire 39 are 0.5 µm or more and 2 µm or less in consideration of production suitability.

A difference between the line width W2B of the second back surface 39B of the second thin metal wire 39 and the line width W1A of the first front surface 38A of the first thin metal wire 38 (W2B−W1A) is preferably less than 4 µm so that the side surface 39C of the second thin metal wire 39 on the rear surface 31B side of the transparent insulating substrate 31 is hardly viewed. Particularly, in order to make the mesh patterns of the first electrode 34 and the second electrode 36 hardly visible and improve viewing angle dependency, it is effective to set the difference between the line widths W2B and W1A (W2B−W1A) to be less than 1 µm.

The blackened layer 40 for reducing specular reflection can be formed of copper oxide, in the case of using copper as the material for forming the first thin metal wire 38 and the second thin metal wire 39, for example.

The formation of the blackened layer 40 reduces specular reflection on the first front surface 38A of the first thin metal wire 38 and the second front surface 39A of the second thin metal wire 39 that are respectively positioned on the viewing side so that pattern visibility caused by reflection of external light can be improved.

Here, since the line widths W1A and W1B of the first thin metal wire 38 and line widths W2A and W2B of the second thin metal wire 39 satisfy the above relationship represented by Formula (1), even in the case in which the blackened layer 40 is formed, the presence of the first thin metal wire 38 and the second thin metal wire 39 is hardly visually recognized. Thus, it is possible to improve pattern visibility caused by reflection of external light while ensuring excellent visibility.

The transparent conductive film 13 is produced by forming the conductive member 32 including the first electrode 34 and the first peripheral wiring 35 on the front surface 31A of the transparent insulating substrate 31 and forming the conductive member 32 including the second electrode 36 and the second peripheral wiring 37 on the rear surface 31B of the transparent insulating substrate 31.

The method of forming these conductive members 32 is not particularly limited. For example, the conductive member 32 can be formed by forming a blackened layer formed of, for example, copper oxide, on the rear surface 31B of the transparent insulating substrate 31, then forming a conductive layer, formed of copper, on each of the front surface 31A and the blackened layer of the rear surface 31B of the transparent insulating substrate 31, further forming a blackened layer, formed of copper oxide, on the conductive layer of the front surface 31A of the transparent insulating substrate 31, forming a patterned resist on each of the blackened layer of the front surface 31A of the transparent insulating substrate 31 and on the conductive layer of the rear surface 31B, and removing copper or copper oxide in unnecessary portions by performing wet etching using an etching solution.

At this time, in a step of exposing the resist formed on the conductive layer, it is preferable to expose the resists applied to both surfaces of the conductive layers formed on both surfaces of the transparent insulating substrate 31 at the same time through an exposure mask. Alignment of the pattern of the first thin metal wire 38 and the pattern of the second thin metal wire 39 can be prepared by exposing both surfaces at the same time. For the etching, wet etching using an etching solution is preferable from the viewpoint of a high etching rate and a low cost without requiring a vacuum device. Further, it is preferable that the conductive members 32 of both surfaces are treated by wet etching at the same time. The step can be simplified by performing etching on both surfaces at the same time and thus production costs can be reduced.

Embodiment 2

Figure 5:
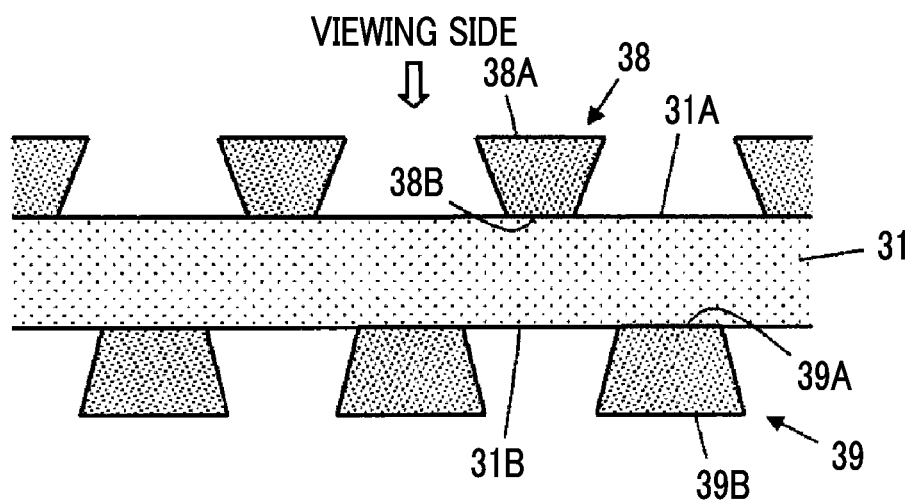
FIG. 5 is a partial cross-sectional view showing a first thin metal wire and a second thin metal wire of a transparent conductive film used for a touch panel according to Embodiment 2.

The transparent conductive film 13 used for the touch panel 11 of Embodiment 1 above has the blackened layers 40 respectively formed on the first front surface 38A of the first thin metal wire 38 on the viewing side and on the second front surface 39A of the second thin metal wire 39 on the viewing side, but the present invention is not limited thereto. For example, as shown in FIG. 5, the first thin metal wire 38 and the second thin metal wire 39 may not have the blackened layers 40.

Even in this case, as long as all of the line widths W1A and W1B of the first thin metal wire 38 and the line widths W2A and W2B of the second thin metal wire 39 are set to be in a range of 0.5 to 10 μm and satisfy the above relationship represented by Formula (1), the first thin metal wire 38 and the second thin metal wire 39 are hardly visually recognized and thus excellent visibility can be ensured.

In addition, the line width W1A of the first thin metal wire 38 and the line width W2A of the second thin metal wire 39 further satisfy the above relationship represented by Formula (2) and thus visibility can be further improved. As long as the line widths W1A and W1B of the first thin metal wire 38 and the line widths W2A and W2B of the second thin metal wire 39 satisfy the above relationship represented by Formula (3), the effect of reflected light according to the viewing angle can be further reduced.

Embodiment 3

Figure 6:
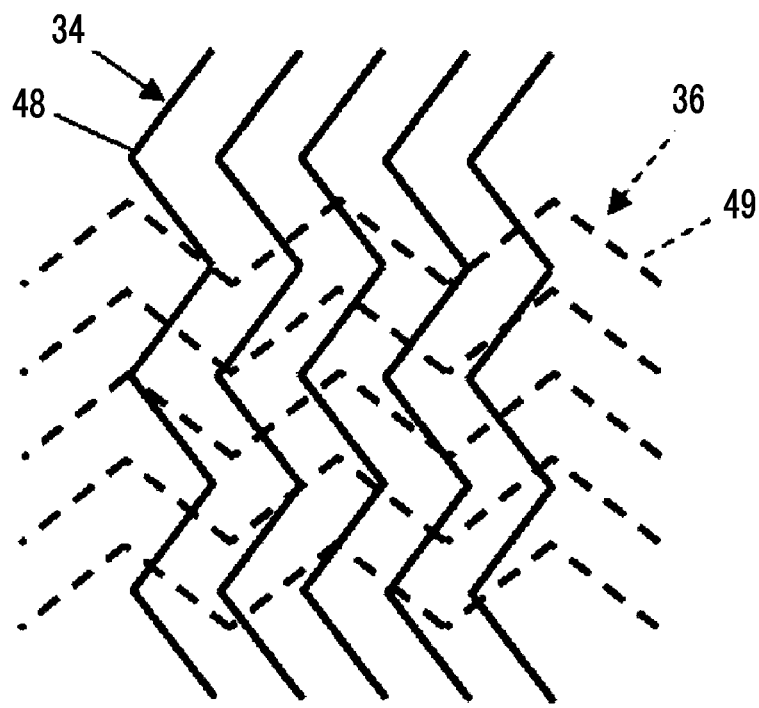
FIG. 6 is a partial plan view showing a detection electrode of a transparent conductive film used for a touch panel according to Embodiment 3.
Figure 7:
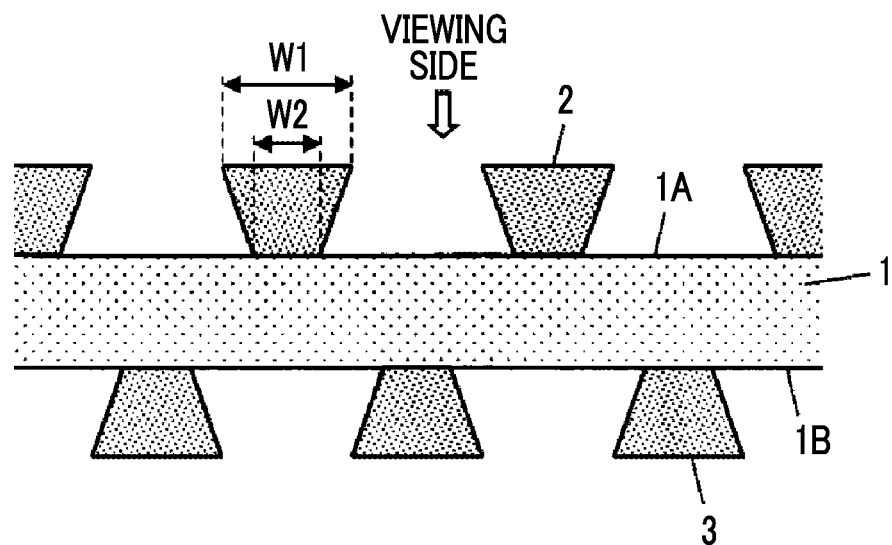
FIG. 7 is a partial cross-sectional view showing a first thin metal wire and a second thin metal wire of a transparent conductive film used for a conventional touch panel.
Figure 8:
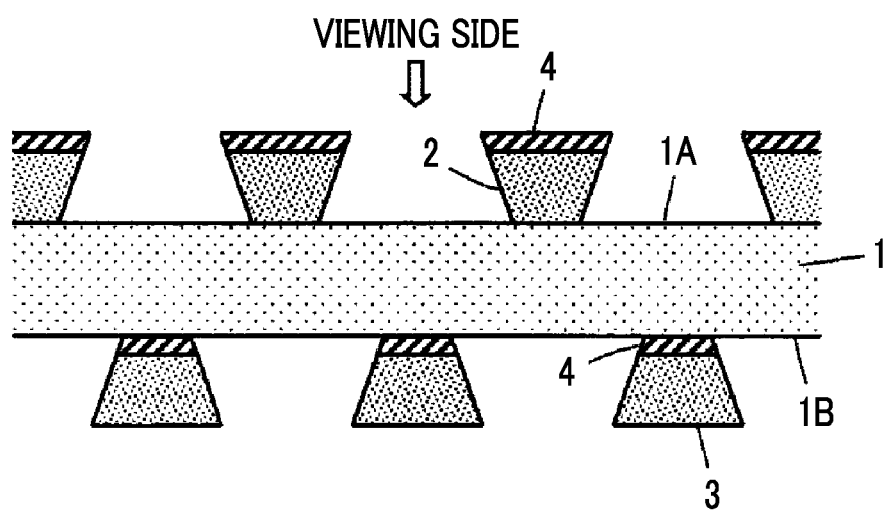
FIG. 8 is a partial cross-sectional view showing a first thin metal wire and a second thin metal wire of a transparent conductive film used for another conventional touch panel.

In Embodiments 1 and 2, as shown in FIG. 3, the first thin metal wire 38 of the first electrode 34 arranged on the front surface 31A of the transparent insulating substrate 31 and the second thin metal wire 39 of the second electrode 36 arranged on the rear surface 31B of the transparent insulating substrate 31 respectively have a mesh pattern, but the present invention is not limited thereto. For example, the transparent conductive film can also be configured such that as shown in FIG. 6, the first electrodes 34 are formed of a plurality of first thin metal wires 48 that are respectively bent and parallel with one another, the second electrodes 36 are formed of a plurality of second thin metal wires 49 that are respectively bent and parallel with one another, and in the case in which the transparent conductive film is viewed from the viewing side, the plurality of first thin metal wires 48 and the plurality of second thin metal wires 49 overlap each other to form a large number of meshes of polygons. In this case, it is preferable that a distance between adjacent first thin metal wires and a distance between adjacent second thin metal wires are 50 to 300 μm from the viewpoint of visibility.

In the case in which such first thin metal wire 48 and second thin metal wire 49 are used, it is also possible to ensure excellent visibility as in Embodiments 1 and 2.

In FIG. 6, as in FIG. 3, in order to easily distinguish the first thin metal wire 48 and the second thin metal wire 49, the second thin metal wire 49 is indicated by a dotted line but is actually formed of a connected wire like the first thin metal wire 48.

In Embodiments 1 to 3, the plurality of first electrodes 34 and the plurality of first peripheral wirings 35 are arranged on the front surface 31A of the transparent insulating substrate 31 and the plurality of second electrodes 36 and the plurality of second peripheral wirings 37 are arranged on the rear surface 31B of the transparent insulating substrate 31. However, the present invention is not limited thereto.

For example, the transparent conductive film can be configured such that the plurality of first electrodes 34 and the plurality of second electrodes 36 are arranged through an interlayer insulating film on either the front surface 31A or the rear surface 31B of the transparent insulating substrate 31 and the plurality of first peripheral wirings 35 and the plurality of second peripheral wirings 37 are arranged on the same surface of the transparent insulating substrate 31.

In addition, the transparent conductive film can be configured to have two substrates. That is, a configuration in which the plurality of first electrodes 34 and the plurality of first peripheral wirings 35 are arranged on a front surface of a first transparent insulating substrate, the plurality of second electrodes 36 and the plurality of second peripheral wirings 37 are arranged on a front surface of a second transparent insulating substrate, and these first transparent insulating substrate and second transparent insulating substrate overlap each other can be employed.

The transparent conductive film according to the present invention can be used for the touch panel shown in FIG. 1 and can be additionally applied to a heat generator for generating heat, an electromagnetic wave shield for shielding electromagnetic wave, and the like.

EXAMPLES

Hereinafter, the present invention is further specifically described based on examples. Materials, used amounts, ratios, the contents of treatments, the treatment procedures, and the like illustrated in the following examples may be appropriately changed unless the change departs from the spirit of the present invention. Thus, the scope of the present invention should not be interpreted in a limited manner based on the examples illustrated below.

Example 1

As shown below, transparent conductive films having the configurations shown in FIGS. 2 to 4 were produced.

First, a polyethylene terephthalate (PET) film having a thickness of 100 μm was prepared as a transparent insulating substrate and an undercoat layer having a thickness of 5 μm was formed on both surfaces of the transparent insulating substrate by using a polyester resin. Further, an adhesion reinforcing layer having a thickness of 100 nm was formed on these undercoat layers using silicon oxide formed by a sol-gel method.

Next, a blackened layer formed of copper oxide and having a thickness of 0.1 μm was formed on the adhesion reinforcing layer positioned on the rear surface of the transparent insulating substrate on the side opposite to the viewing side by sputtering. Further, a copper layer having a thickness of 0.9 μm was formed on each of the adhesion reinforcing layer on the front surface side and the blackened layer on the rear surface side of the transparent insulating substrate by sputtering and a blackened layer formed of copper oxide and having a thickness of 0.1 μm was formed on the copper layer on the front surface side by sputtering. Thus, a laminate in which the copper layer with the blackened layer was arranged on each of the front surface and the rear surface of the transparent insulating substrate was formed.

A resist was applied to each of the front surface and the rear surface of the laminate, and pre-baking was performed at a temperature of 80° C. for 30 minutes. Pattern exposure was performed on the resists on the front surface and the rear surface of the laminate through respective first exposure mask and second exposure mask made of quartz using ultraviolet rays while exposing both surfaces at the same time. After the exposure, the resists were developed with alkali and patterned. Then, post-baking was performed at a temperature of 120° C. for 1 hour.

The patterns on both surfaces of the laminate adopted a diamond-like mesh shape that is a mesh shape as shown in FIG. 3 and has a mesh pitch of 400 μm on each of the front surface and the rear surface of the laminate and a narrow angle of the intersecting angle of 60 degrees. A line width M1 of a first exposure mask for the first thin metal wire on the viewing side was set to 3.0 μm and a line width M2 of a second exposure mask for the second thin metal wire on the side opposite to the viewing side was set to 4.0 μm.

With respect to the laminate having the patterned resists, copper and copper oxide on both surfaces of the laminate were etched at the same time by wet etching using an etching solution of an aqueous solution of ferric chloride at a temperature of 40° C.

Then, the resists were peeled off from both surfaces of the laminate, and the laminate was washed with water and dried. Thus, a transparent conductive film of Example 1 was produced.

Examples 2 and 3

Transparent conductive films of Examples 2 and 3 were respectively produced in the same manner as in Example 1 except that the line width M2 of the second exposure mask for the second thin metal wire on the side opposite to the viewing side was set to 3.5 μm and 3.2 μm.

Example 4

A transparent conductive film of Example 4 was produced in the same manner as in Example 1 except that the line width M1 of the first exposure mask for the first thin metal wire on the viewing side was set to 4.0 μm, and the line width M2 of the second exposure mask for the second thin metal wire on the side opposite to the viewing side was set to 5.0 μm.

Examples 5 and 6

Transparent conductive films of Examples 5 and 6 were respectively produced in the same manner as in Example 4 except that the line width M2 of the second exposure mask for the second thin metal wire on the side opposite to the viewing side was set to 4.5 μm and 4.2 μm.

Example 7

A transparent conductive film of Example 7 was produced in the same manner as in Example 1 except that the thicknesses of the copper layers of both surfaces of the transparent insulating substrate were changed to 1.9 μm, the line width M1 of the first exposure mask for the first thin metal wire on the viewing side was set to 5.0 μm, and the line width M2 of the second exposure mask for the second thin metal wire on the side opposite to the viewing side was set to 6.0 μm.

Examples 8 and 9

Transparent conductive films of Examples 8 and 9 was respectively produced in the same manner as in Example 7 except that the line width M2 of the second exposure mask for the second thin metal wire on the side opposite to the viewing side was set to 5.5 μm and 5.2 μm.

Examples 10 and 11

Transparent conductive films of Examples 10 and 11 was respectively produced in the same manner as in Examples 4 and 5 except that a layer of copper having a thickness of 0.5 was further formed on the copper layer on only the rear surface of the transparent insulating substrate on the side opposite to the viewing side to increase the thickness of the copper layer.

Comparative Example 1

A transparent conductive film of Comparative Example 1 was produced in the same manner as in Example 1 except that the line width M2 of the second exposure mask for the second thin metal wire on the side opposite to the viewing side was set to 3.0 μm.

Comparative Example 2

A transparent conductive film of Comparative Example 2 was produced in the same manner as in Example 4 except that the line width M2 of the second exposure mask for the second thin metal wire on the side opposite to the viewing side was set to 4.0 μm.

Comparative Example 3

A transparent conductive film of Comparative Example 3 was produced in the same manner as in Example 7 except that the line width M2 of the second exposure mask for the second thin metal wire on the side opposite to the viewing side was set to 5.0 μm.

The cross section of each of the transparent conductive films of Examples 1 to 11 and Comparative Examples 1 to 3 was observed using an electron microscope and shown in FIG. 4, and the line width W1A of the first front surface 38A of the first thin metal wire 38 that was directed to the viewing side, the line width W1B of the first back surface 38B that was directed to the side opposite to the viewing side, the line width W2A of the second front surface 39A of the second thin metal wire 39 that was directed to the side opposite to the viewing side, and the line width W2B of the second back surface 39B that was directed to the side opposite to the viewing side were measured.

In addition, the mesh visibility and the viewing angle of each of the transparent conductive films of Examples 1 to 11 and Comparative Examples 1 to 3 were evaluated.

The measurement results and evaluation results thereof are shown in Table 1.

TABLE 1

| | Mask design value (μm) | | Measured value (μm) | | | | | | Evaluation result | |
|---|---|---|---|---|---|---|---|---|---|---|
| | M1 | M2 | W1A | W1B | H1 | W2A | W2B | H2 | Mesh visibility | Viewing angle |
| EXAMPLE 1 | 3.00 | 4.00 | 3.02 | 2.04 | 1.0 | 2.99 | 3.96 | 1.0 | A | A |
| EXAMPLE 2 | 3.00 | 3.50 | 3.05 | 2.06 | 1.0 | 2.56 | 3.52 | 1.0 | A | A |
| EXAMPLE 3 | 3.00 | 3.20 | 3.03 | 2.05 | 1.0 | 2.28 | 3.22 | 1.0 | A | A |
| EXAMPLE 4 | 4.00 | 5.00 | 4.04 | 3.10 | 1.0 | 4.01 | 5.02 | 1.0 | A | B |
| EXAMPLE 5 | 4.00 | 4.50 | 3.98 | 3.02 | 1.0 | 3.52 | 4.53 | 1.0 | A | B |
| EXAMPLE 6 | 4.00 | 4.20 | 4.02 | 3.06 | 1.0 | 3.24 | 4.22 | 1.0 | A | B |
| EXAMPLE 7 | 5.00 | 6.00 | 4.98 | 2.98 | 2.0 | 4.01 | 6.02 | 2.0 | B | C |
| EXAMPLE 8 | 5.00 | 5.50 | 5.00 | 3.02 | 2.0 | 3.51 | 5.52 | 2.0 | A | C |
| EXAMPLE 9 | 5.00 | 5.20 | 4.99 | 3.01 | 2.0 | 3.26 | 5.26 | 2.0 | B | C |
| EXAMPLE 10 | 4.00 | 5.00 | 4.04 | 2.42 | 1.0 | 4.02 | 4.96 | 1.5 | A | A |
| EXAMPLE 11 | 4.00 | 4.50 | 3.98 | 2.38 | 1.0 | 3.62 | 4.54 | 1.5 | A | A |
| COMPARATIVE EXAMPLE 1 | 3.00 | 3.00 | 3.04 | 2.04 | 1.0 | 1.98 | 3.02 | 1.0 | D | B |
| COMPARATIVE EXAMPLE 2 | 4.00 | 4.00 | 4.01 | 3.02 | 1.0 | 2.98 | 3.98 | 1.0 | D | B |
| COMPARATIVE EXAMPLE 3 | 5.00 | 5.00 | 4.98 | 2.96 | 2.0 | 2.95 | 4.96 | 2.0 | D | C |

The evaluation of the mesh visibility was performed such that the transparent conductive film was arranged on a horizontal black plate so that the second thin metal wire was placed on the black plate side (on the side opposite to the viewing side), white light was emitted to the transparent conductive film from the upper side, and the transparent conductive film was visually observed at a depression angle of 45 degrees at two points of an observation point at a height of 40 cm from the transparent conductive film and an observation point at a height of 10 cm from the transparent conductive film, respectively, to evaluate whether or not the mesh-like thin metal wire was visually recognized.

In Table 1, the evaluation result A in the evaluation of the mesh visibility refers to a level exhibiting excellent visibility at which no mesh-like thin metal wire is visually recognized at both the observation point at a height of 40 cm and the observation point at a height of 10 cm, and the evaluation result B refers to a level having no practical problem in visibility at which while the mesh-like thin metal wire is not visually recognized at the observation point at a height of 40 cm, the mesh-like thin metal wire is slightly visually recognized at the observation point at a height of 10 cm, respectively. In contrast, the evaluation result D refers to a level having a problem in visibility at which the presence of the first thin metal wire is noticeable at both the observation point at a height of 40 cm, the observation point at a height of 10 cm and the mesh-like thin metal wire is apparently visually recognized.

The evaluation of the viewing angle was performed such that the transparent conductive film was arranged on a horizontal black plate so that the second thin metal wire was placed on the black plate side (on the side opposite to the viewing side), white light was emitted to the transparent conductive film from the upper side, and at a height of 20 cm from the transparent conductive film and the transparent conductive film was observed at three kinds of angles of 60 degrees, 45 degrees, and 30 degrees, respectively, to evaluate whether or not metallic luster was observed in the transparent conductive film.

In Table 1, the evaluation result A in the evaluation of the viewing angle refers to a level exhibiting excellent visibility at which metallic luster is not observed at any of angles of 60 degrees, 45 degrees, and 30 degrees, the evaluation result B refers to a level having no problem at which metallic luster is not observed at angles of 60 degrees and 45 degrees but is slightly observed at an angle of 30 degrees, and the evaluation result C refers to a level having no practical problem at which metallic luster is not observed at angle of 60 degrees but is observed an angles of 45 degrees and 30 degrees.

All of the transparent conductive films of Examples 1 to 3 satisfied Formula (1), that is,
a relationship of $W1B < W2A \leq W1A < W2B$, Formula (2), that is,
a relationship of $W1A - W2A \leq 0.3 \times W1A$, and Formula (3), that is,
a relationship of $W2B - W2A < W1A - W1B$,
a difference between the line widths W2B and W1A (W2B−W1A) was less than 1 μm, and both the evaluation result of the mesh visibility and the evaluation result of the viewing angle were A. It was confirmed that transparent conductive films having excellent visibility and viewing angle dependency could be obtained.

All of the transparent conductive films of Examples 4 to 6 satisfied the above relationships of Formulae (1) and (2), a difference between the line widths W2B and W1A (W2B−W1A) was less than 1 μm, and the evaluation result of the mesh visibility was A. All of the transparent conductive films of Examples 4 to 6 did not satisfy the relationship of Formula (3) and the evaluation result of the viewing angle was B. However, the metallic luster was at a level having no problem. It was confirmed that transparent conductive films having excellent visibility and sufficient viewing angle dependency could be obtained.

The transparent conductive film of Example 7 did not satisfy the relationship of Formula (3) while satisfying the relationships of Formulae (1) and (2), a difference between the line widths W2B and W1A (W2B−W1A) was less than 1 μm, the evaluation result of the mesh visibility was B, and the evaluation result of the viewing angle was C. Here, it was confirmed that a sufficiently practical transparent conductive film could be obtained.

The transparent conductive film of Example 8 satisfied the relationships of Formulae (1) and (2), a difference between the line widths W2B and W1A (W2B−W1A) was less than 1 μm, and the evaluation result of the mesh visibility was A. The transparent conductive film of Example 8 did not satisfy the relationship of Formula (3), and the evaluation result of the viewing angle was C. However, the metallic luster was at a level having no practical problem. It was confirmed that a practical transparent conductive film having excellent visibility could be obtained.

The transparent conductive film of Example 9 satisfy the relationship of Formula (1) and a difference between the line widths W2B and W1A (W2B−W1A) was less than 1 μm. However, the transparent conductive film did not satisfy the relationships of Formulae (2) and (3), the evaluation result of the mesh visibility was B, and the evaluation result of the viewing angle was C. Here, it was confirmed that a sufficiently practical transparent conductive film could be obtained.

All of the transparent conductive films of Examples 10 and 11 satisfied the relationships of Formulae (1), (2), and (3), a difference between the line widths W2B and W1A (W2B−W1A) was less than 1 μm, and the thickness H2 of the second thin metal wire was set to a value larger than the thickness H1 of the first thin metal wire. The evaluation result of the mesh visibility and the evaluation result of the viewing angle were A. It was confirmed that transparent conductive films having excellent visibility and viewing angle dependency could be obtained.

On the other hand, all of the transparent conductive films of Comparative Examples 1 to 3 did not satisfy the relationship of Formula (1) and the evaluation result of the mesh visibility was D. The mesh-like thin metal wire was apparently observed at both the observation point at a height of 40 cm and the observation point at a height of 10 cm and it was confirmed that there was a problem in visibility.

EXPLANATION OF REFERENCES

1: transparent insulating substrate
1A: front surface
1B: rear surface
2, 3: copper wiring
4: blackened layer
11: touch panel
12: support
13: transparent conductive film
14: adhesive
31: transparent insulating substrate
31A: front surface
31B: rear surface
32: conductive member
33: protective layer
34: first electrode
35: first peripheral wiring
36: second electrode
37: second peripheral wiring
38, 48: first thin metal wire
38A: first front surface
38B: first back surface
38C, 39C: side surface
39, 49: second thin metal wire
39A: second front surface
39B: second back surface
40: blackened layer
S1: transmissive region
S2: peripheral region
D1: first direction
D2: second direction
W1, W2, W1A, W1B, W2A, W2B: line width
H1, H2: thickness

What is claimed is:

1. A transparent conductive film having a transmissive region comprising:
    a first electrode formed of a first thin metal wire arranged in the transmissive region; and
    a second electrode formed of a second thin metal wire arranged on a side opposite to a viewing side from the first electrode so as to intersect the first thin metal wire in the transmissive region,
    wherein the first thin metal wire has a first front surface that is directed to the viewing side and has a line width W1A, and a first back surface that is directed to the side opposite to the viewing side and has a line width W1B, the second thin metal wire has a second front surface that is directed to the viewing side and has a line width W2A, and a second back surface that is directed to the side opposite to the viewing side and has a line width W2B, and the line widths W1A, W1B, W2A, and W2B are in a range of 0.5 to 10 μm, and
    the line widths satisfy a relationship of W1B<W2A≤W1A<W2B.

2. The transparent conductive film according to claim 1, wherein the line widths W1A and W2A satisfy a relationship of W1A−W2A≤0.3×W1A.

3. The transparent conductive film according to claim 2, wherein a difference between the line width W2B and the line width W1A is less than 4 μm.

4. The transparent conductive film according to claim 3, wherein the difference between the line width W2B and the line width W1A is less than 1 μm.

5. The transparent conductive film according to claim 2, wherein the line widths W1A, W1B, W2A, and W2B satisfy a relationship of W2B−W2A<W1A−W1B.

6. The transparent conductive film according to claim 5, wherein a thickness H2 of the second thin metal wire is larger than a thickness H1 of the first thin metal wire.

7. The transparent conductive film according to claim 5, wherein a difference between the line width W2B and the line width W1A is less than 4 μm.

8. The transparent conductive film according to claim 7, wherein the difference between the line width W2B and the line width W1A is less than 1 μm.

9. The transparent conductive film according to claim 1, wherein the line widths W1A, W1B, W2A, and W2B satisfy a relationship of W2B−W2A<W1A−W1B.

10. The transparent conductive film according to claim 9, wherein a thickness H2 of the second thin metal wire is larger than a thickness H1 of the first thin metal wire.

11. The transparent conductive film according to claim 9, wherein a difference between the line width W2B and the line width W1A is less than 4 μm.

12. The transparent conductive film according to claim 11, wherein the difference between the line width W2B and the line width W1A is less than 1 μm.

13. The transparent conductive film according to claim 1, wherein a difference between the line width W2B and the line width W1A is less than 4 μm.

14. The transparent conductive film according to claim 13, wherein the difference between the line width W2B and the line width W1A is less than 1 μm.

15. The transparent conductive film according to claim 1, wherein the line width W1A is 1.5 μm or more and 5 μm or less, and the thickness H1 of the first thin metal wire and the thickness H2 of the second thin metal wire are 0.5 μm or more and 3 μm or less.

16. The transparent conductive film according to claim 1, wherein the first front surface of the first thin metal wire and the second front surface of the second thin metal wire are blackened layers.

17. The transparent conductive film according to claim 1, wherein the first thin metal wire and the second thin metal wire are formed of copper.

18. The transparent conductive film according to claim 1, wherein the first electrode and the second electrode are respectively arranged on both surfaces of one transparent insulating substrate.

19. A touch panel using the transparent conductive film according to claim 1.

* * * * *